United States Patent
Ardeli et al.

(10) Patent No.: US 9,713,051 B2
(45) Date of Patent: Jul. 18, 2017

(54) SESSION AWARE ACCESS POINT LOAD BALANCING

(71) Applicant: Aruba Networks, Inc., Sunnyvale, CA (US)

(72) Inventors: Ramesh Ardeli, Sunnyvale, CA (US); Hari Krishna Kurmala, Sunnyvale, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 0 days.

(21) Appl. No.: 14/524,743

(22) Filed: Oct. 27, 2014

(65) Prior Publication Data

US 2016/0119819 A1    Apr. 28, 2016

(51) Int. Cl.
*H04W 36/08* (2009.01)
*H04W 76/06* (2009.01)
*H04W 36/22* (2009.01)
*H04W 28/08* (2009.01)

(52) U.S. Cl.
CPC .......... *H04W 36/08* (2013.01); *H04W 36/22* (2013.01); *H04W 76/064* (2013.01); *H04W 28/08* (2013.01)

(58) Field of Classification Search
CPC ... H04L 63/102; H04L 63/107; H04L 63/108; H04L 63/1458; H04L 29/06027; H04L 29/08072; H04W 12/12; H04W 74/06; H04W 84/12; H04W 12/08; H04W 8/005; H04W 24/02; H04W 60/00; H04W 92/045; H04W 88/08; H04W 88/16
See application file for complete search history.

(56) References Cited

U.S. PATENT DOCUMENTS

| | | | |
|---|---|---|---|
| 2004/0068668 A1* | 4/2004 | Lor | H04L 63/107 726/15 |
| 2005/0059396 A1* | 3/2005 | Chuah | H04W 24/02 455/435.1 |
| 2005/0060319 A1* | 3/2005 | Douglas | H04W 24/00 |
| 2016/0021564 A1* | 1/2016 | Agarwal | H04W 28/0289 455/452.2 |

* cited by examiner

*Primary Examiner* — Yee Lam
(74) *Attorney, Agent, or Firm* — Brooks, Cameron & Huebsch, PLLC (57) ABSTRACT

The present disclosure discloses a method and a network device for session aware access point load balancing. Specifically, a network device monitors data corresponding to a plurality of client devices associated with a first access point. Then, the network device determines whether the data matches particular criteria. Responsive to determining that the data matches the particular criteria, the network device select at least a first client device of the plurality of client devices for disassociation and/or de-authentication. Moreover, the network device causes disassociation and/or de-authentication of the first client device from the first access point.

16 Claims, 7 Drawing Sheets

FIG. 1

APPLICATION MAPPING TABLE 200

| APPLICATION 220 | APPLICATION-CATEGORY 240 | ACCESS CATEGORY 260 | PRIORITY 280 |
|---|---|---|---|
| Gmail | Webmail | Back-ground | Lowest |
| Bit torrent | Peer-to-Peer | Back-ground | |
| eDonkey | Peer-to-Peer | Back-ground | |
| Yahoo Messenger | Instant-messaging | Best-effort | |
| WhatsApp | Instant-messaging | Best-effort | ↓ |
| WeChat | Instant-messaging | Best-effort | |
| Twitter | Web | Best-effort | |
| Facebook | Web | Best-effort | |
| YouTube | Web | Non-enterprise video | |
| Netflix | Audio-video | Non-enterprise video | |
| Skype | Instant-messaging | Non-enterprise video | |
| GoToMeeting | Audio-video | Enterprise video | |
| WebEx | Audio-video | Enterprise video | |
| Adobe-Connect | Audio-video | Enterprise video | |
| Lync-video | Audio-video | Enterprise video | |
| Gtalk | Instant-messaging | Voice | |
| Jabber | Instant-messaging | Voice | |
| Lync-audio | Audio-video | Voice | Highest |

FIG. 2

CLIENT ACCESS
CATEGORY TABLE
300

| CLIENT MAC 320 | NUMBER OF SESSIONS 340 | | | | |
|---|---|---|---|---|---|
| | VOICE 350 | ENTERPRISE VIDEO 360 | NON-ENTERPRISE VIDEO 370 | BEST-EFFORT 380 | BACK GROUND 390 |
| AA:BB:CC:DD:EE:01 | 0 | 0 | 2 | 5 | 10 |
| AA:BB:CC:DD:EE:02 | 0 | 0 | 0 | 5 | 5 |
| AA:BB:CC:DD:EE:03 | 1 | 0 | 0 | 5 | 10 |
| AA:BB:CC:DD:EE:04 | 0 | 0 | 1 | 0 | 20 |
| AA:BB:CC:DD:EE:05 | 0 | 1 | 0 | 2 | 10 |

FIG. 3

MAXIMUM CAPACITY LIMITS
400

| ACCESS CATEGORY 420 | CAPACITY 440 |
|---|---|
| Voice ($P_{max}$) | 16 |
| Enterprise Video ($Q_{max}$) | 32 |
| Non-enterprise Video ($R_{max}$) | 64 |
| Best-effort ($S_{max}$) | 256 |
| Back-ground ($T_{max}$) | 512 |

FIG. 4A

| AP 460 | NUMBER OF SESSIONS 470 | | | | | LOAD FACTOR 480 |
|---|---|---|---|---|---|---|
| | VOICE (cur/max) | E VIDEO (cur/max) | NE VIDEO (cur/max) | BE (cur/max) | BG (cur/max) | |
| $AP_1$ | 8/16 | 6/32 | 28/64 | 40/256 | 64/512 | 90 |
| $AP_2$ | 2/16 | 4/32 | 16/64 | 80/256 | 40/512 | 76 |
| $AP_3$ | 6/16 | 0/32 | 10/64 | 40/256 | 24/512 | 36 |
| $AP_4$ | 0/16 | 2/32 | 16/64 | 28/256 | 40/512 | 50 |
| ... | | | | | | |
| $AP_n$ | 4/16 | 12/32 | 8/64 | 56/256 | 52/512 | 80 |

SESSION AWARE ACCESS POINT LOAD BALANCING

FIELD

Embodiments of the present disclosure relate to client management by network devices. In particular, embodiments of the present disclosure describe a method and system for performing session aware access point bad balancing in a network.

BACKGROUND

Access point (AP) bad balancing mechanisms implemented by different vendors take into account the number of client devices associated to each AP as a key factor to determine whether there is any skew in the loads among different APs. However, the number of client devices alone does not always provide enough granularities for determining the bad of an AP, because some client devices could be silent, whereas other client devices could be doing large amount of data transfers across multiple sessions. Most of the conventional AP client bad balancing techniques focus on preventing an AP from getting into an uneven distribution of bad using, for example, the total number of associated client devices as a metric. Nevertheless, these AP client bad balancing techniques cannot solve the problem for an AP, which is handling more than its designed capacity.

In addition, no current AP load balancing technique looks into the nature of sessions currently in transit among the APs and client devices. Conventional client management techniques typically perform client steering only when the Signal-to-Noise Ratio (SNR) drops below a predetermined threshold value. If a client device continues to have good SNR, the client device will continue to be associated with the same AP. This is so even though the AP is overloaded with other client devices doing heavy data transfer, whereas at least one other adjacent AP is lightly loaded and can serve the client device's better.

Moreover, each AP may support multiple access categories, which include but are not limited to, voice, video, best effort, and background. In order for client devices to have a seamless wireless network experience, each AP is designed to support a maximum number of sessions for a particular access category. For example, when an AP is supporting 20 client devices with concurrent voice sessions, the client devices may experience increased latency, jitter, etc. Conventionally, call admission control (CAC) can be used to deny additional voice sessions when the AP is overloaded. However, there are at least two limitations to the CAC. First, CAC only applies to client devices running voice sessions, but does not apply to other client devices running video and/or unified communication sessions. Second, once a client device is already associated with an AP, the AP cannot deny the session anymore.

DETAILED DESCRIPTION

In the following description, several specific details are presented to provide a thorough understanding. While the context of the disclosure is directed to client management by network devices, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

BRIEF DESCRIPTION OF THE DRAWINGS

The present disclosure may be best understood by referring to the following description and accompanying drawings that are used to illustrate embodiments of the present disclosure.

OVERVIEW

Embodiments of the present disclosure relate to client management by network devices. In particular, embodiments of the present disclosure describe a method and network device for performing session aware access point load balancing in a network.

In generally, embodiments of present disclosure address the real-time skew in loads among APs by taking into account the nature of sessions of various WiFi access categories that are actually in transit using deep packet inspection (DPI). Therefore, the techniques described herein are able to prevent an AP from getting into uneven load distribution, as well as "cure" an AP when the AP is handling more than the AP's designed capacity.

Specifically, if an AP is found to be handling a max capacity in terms of sessions, the AP shall not accept association requests from any new client devices. Also, if the AP is found to be handling more than the designed capacity, one or more client devices are selected to be steered away from the current AP to an adjacent AP that is less loaded, where the client device has an acceptable SNR for its communication with the adjacent AP. The selection of the client depends on multiple factors including, but not limited to, the client device is not running latency sensitive sessions like voice or live streaming; the client device is having acceptable SNR with an adjacent AP; the client device is running high data transfer sessions; etc. Thus, the AP is dynamically load balanced when there is a skew in load distribution in the number of sessions handled rather than the number of clients.

With the solution provided herein, a network device monitors data corresponding to a plurality of client devices associated with a first access point. Then, the network device determines whether the data matches particular criteria. Responsive to determining that the data matches the particular criteria, the network device select at least a first client device of the plurality of client devices for disassociation and/or de-authentication. Moreover, the network device causes disassociation and/or de-authentication of the first client device with the first access point.

According to some embodiments of the present disclosure, a network device selects at least a first client device of a first plurality of client devices, associated with a first access point, for disassociation and/or de-authentication. Moreover, the network device selects a second access point with which the client device is to be associated based on current sessions for a second plurality of client devices associated with the second access point. Then, the network device causes the first client device to associate with the second access point.

Network Computing Environment

Figure 1:
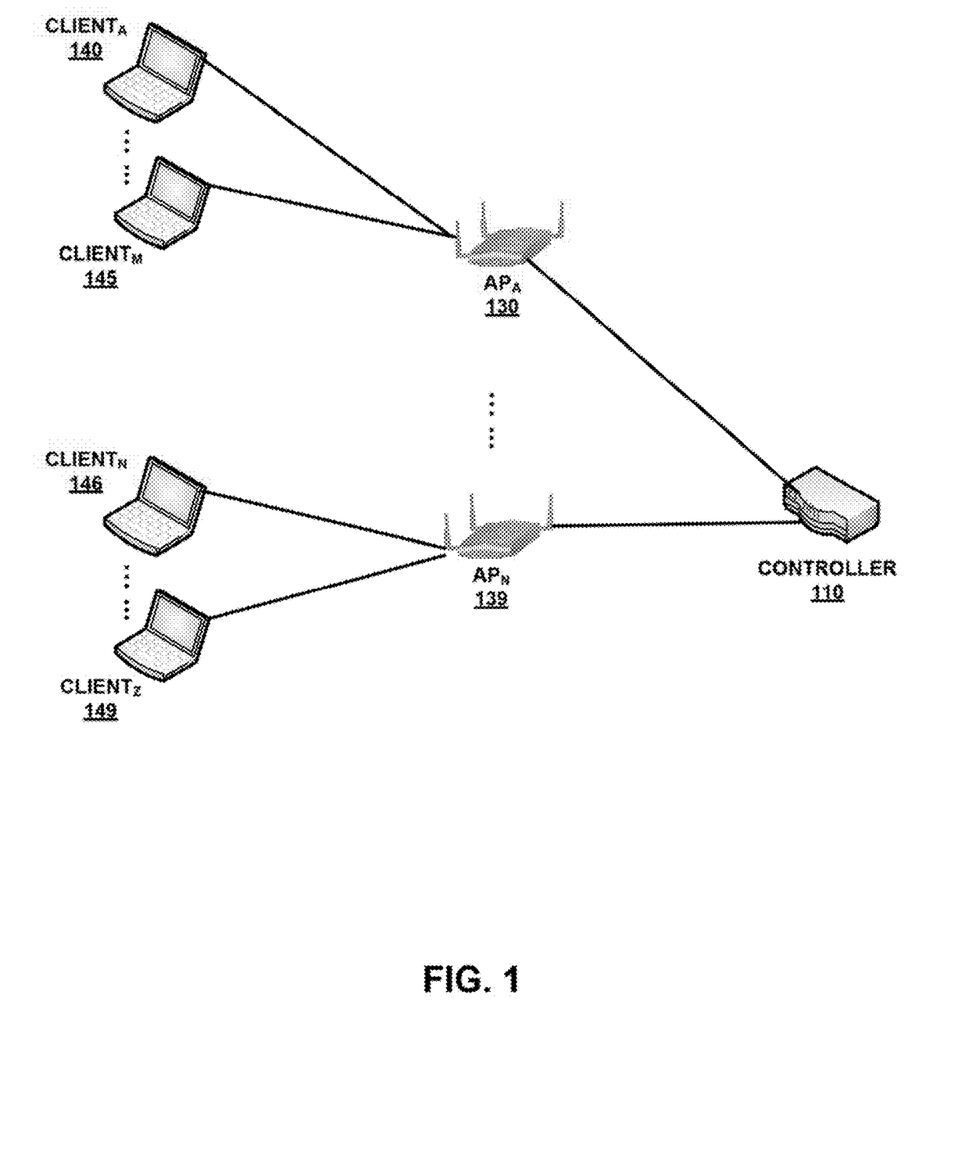
FIG. 1 shows an exemplary network environment according to embodiments of the present disclosure.

FIG. 1 shows an exemplary network environment according to embodiments of the present disclosure. Specifically, FIG. 1 illustrates a network that includes at least a web server 160 that hosts a website 170, Internet 150, a network controller 110, a number of access points (APs) (such as, $AP_A$ 130 to $AP_N$ 139), and a plurality of client devices, such as $Client_A$ 140, ..., $Client_M$ 145, $Client_N$ 146, ..., $Client_Z$ 149, etc.

Network controller 110 generally refers to a controlling device that manages other network devices such as wireless access points. Network controller 110 may handle automatic adjustments to radio frequency power, wireless channels, wireless authentication, and/or security, and deliver essential mobility services such as AppRF™ technology for OSI Layer 4-7 application control, multicast Domain Name System (DNS) optimization, IP roaming, and Security Assertion Markup Language (SAML) integration based on user roles, devices, applications and location. Furthermore, network controller 110 can be combined to form a wireless mobility group to allow inter-controller roaming. In some embodiments, network controller 110 can centralize IP services and policy control across wired and wireless as well as simplify the integration of network security and third-party enterprise application platforms.

Access points, e.g., $AP_A$ 130 to $AP_N$ 139, generally refer to a set of wireless network devices that allow wireless client devices to connect to a wired network using IEEE 802.11 or related standards. The APs usually connect to a router via a wired network, but can also be an integral component of the router itself. Access point is usually designed to handle a certain number of sessions belonging to various access categories while conforming to acceptable user experience.

Each access point serves one or more client devices. For illustration purposes only, assuming that, in FIG. 1, a first set of client devices, such as $Client_A$ 140, ..., $Client_M$ 145, associate with $AP_A$ 130. Moreover, assuming that a second set of client devices, such as $Client_N$ 146, ..., $Client_Z$ 149, associate with $AP_N$ 139. Each client device may be executing an application session that belongs to one or more access categories.

During operations, an AP (e.g., $AP_A$ 130) may be able to support only a limited number of sessions from a particular access category. For example, $AP_A$ 130 may only be able to support 5 concurrent voice communication sessions. For illustration purposes only, assuming that there are 6 active voice client devices and 4 other client devices that are associated with $AP_A$ 130.

Here, controller 110 is able to identify a first AP (e.g., $AP_A$ 130) whose concurrent sessions associated with a particular access category exceeds a predetermined threshold value. Moreover, controller 110 will identify a second AP (e.g., $AP_N$ 139) in the same RF neighborhood of the first AP (e.g., $AP_A$ 130) that has the additional capacities. Next, the network infrastructure will select one or more of the client devices associated with the first AP (e.g., $AP_A$ 130) and belonging to a different access category, and steer the selected client devices to the second AP (e.g., $AP_N$ 139).

Since voice sessions are latency and/or jitter sensitive, an end user will experience delay if an access point handles more than its designed capacity. Similarly, video sessions could experience buffering. Thus, if more client devices start simultaneous video sessions on the same AP beyond its capacity, the client devices will have poor network experience. Therefore, the maximum s are defined for each access category for an access point based on a number of factors. The factors may include, but are not limited to: (a) a total number of bands supported; (b) the processor's capacity in AP; (c) the WiFi connection type (11n/11ac).

Application Classification

The deep packet inspection (DPI) engine running on a network controller classifies the sessions after processing one or more data packets. When a new session is created, the network controller shall perform deep packet inspection (DPI) to determine the application type that the session belongs to. Since not all applications are classified as belonging to a particular application on the receipt of first data packet, it may take a number of received packets (e.g., up to 7 packets) for the network controller to classify a session. In some embodiments, the session is partially classified. It implies that the DPI engine needs more data packets to determine the final classification for the session. In some embodiments, the session is terminally classified, and thus the session is finally marked with the corresponding application identifier.

Application to Access Category Mapping

Figure 2:
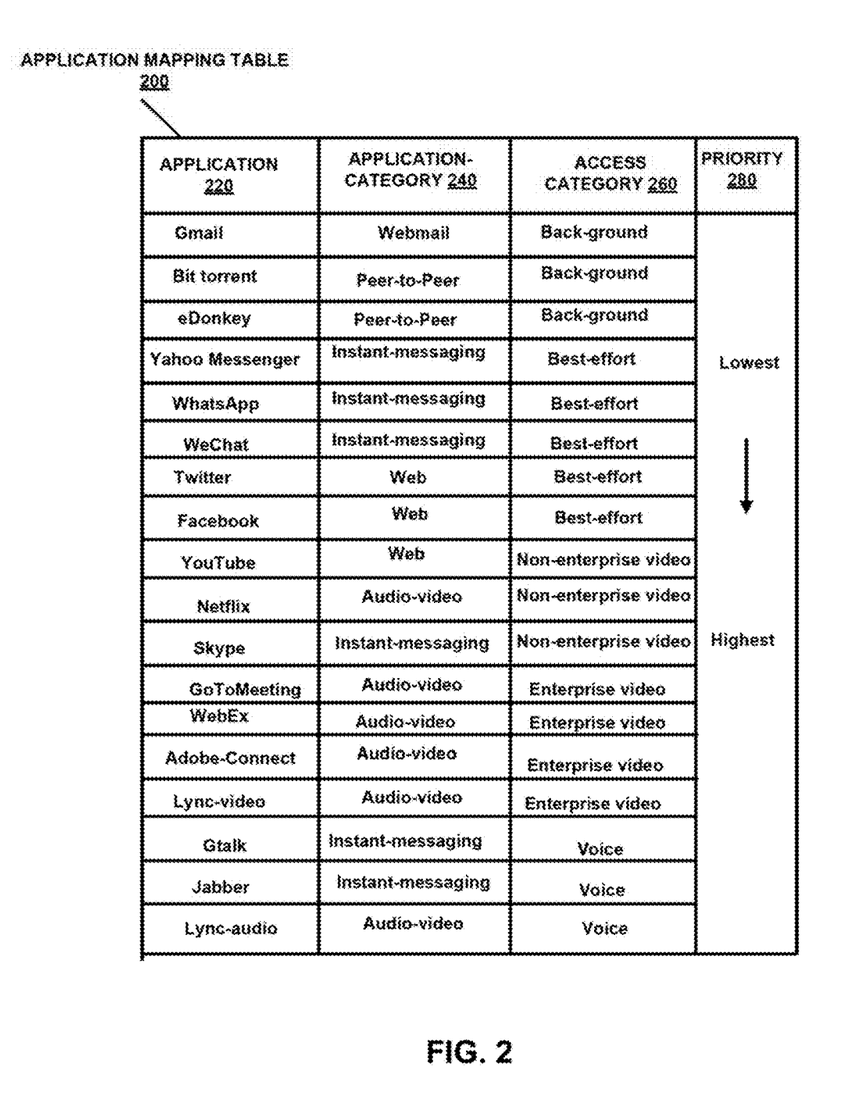
FIG. 2 shows a diagram illustrating an exemplary application mapping table according to embodiments of the present disclosure.

Network controller can maintain an application or application category to access-category mapping table for all the applications and/or application categories supported. FIG. 2 shows exemplary application mapping table according to embodiments of the present disclosure. Application mapping table 200 in FIG. 2 includes at least an application field 220, an application category field 240, an access category field 260, and a priority field 280.

Application field 220 indicates the specific application, e.g., GMail®, BitTorrent®, eDonkey®, Yahoo® Messenger, WhatsApp®, WeChat®, Twitter®, Facebook®, Youtube®, Netflix®, Skype®, GoToMeeting®, WebEx®, Adobe-Connect®, Lync® video, GTalk®, Jabber®, Lync® audio, etc.

Application category field 240 indicates the category corresponding to each application, including but not limited to, webmail, web, instant messaging, peer-to-peer, audio-video, etc.

Access category field 260 indicates a corresponding service category for each application. Note that, IEEE 802.11e standard specifies the following four access-categories for classifying various traffic types: (1) Voice, (2) Video, (3) Best-effort, and (4) Background.

Furthermore, an application can be categorized as an enterprise application used heavily for business needs, or a non-enterprise application, used by employees for personal needs. All applications can be categorized as enterprise or non-application application based on their importance to an organization. In addition, because a voice application is sensitive to latency and/or jitter rather than bandwidth, all voice applications can be put in one single category. On the other hand, a video application requiring high bandwidths can be categorized into (a) streaming, (b) enterprise online-conference, and/or (c) personal online-conference.

Thus, all the applications can be categorized into a number of categories, including but not limited to, background access, best effort access, non-enterprise video access, enterprise video access, voice access, etc. A network controller can maintain the application and/or application-category to access-category mapping table shown in FIG. 2 for all applications and application-categories supported in the system. This exemplary mapping can be overridden or replaced by an enterprise customer, and thus providing the flexibility to a network administrator to define its own customized mappings. The default mapping from an application/application-category to access-category for some of the applications is shown in FIG. 2. This default mapping can be overridden by the customer through CLI/GUI to meet their needs. In some embodiments, if the client devices in the network have been steered to neighboring APs too frequently, the network controller can dynamically adjust the configurable threshold value indicating the minimum acceptable SNR value to be lower than the current value.

Once the session is terminally classified as belonging to a particular application, the network controller's stateful firewall architecture can map the session to one of these five access categories based on the application to which this session is classified as.

Client Access Category

The network controller can maintain a new lookup table, indexed on client's MAC address, which includes the number of sessions falling in the five access categories, currently in transit for each client. Once the session is terminally classified as a particular application, depending on the application to access-category mapping, the corresponding counter is incremented for the client device executing the particular application. Similarly, when the session is timed out, the corresponding counter is decremented for the client device.

Figure 3:
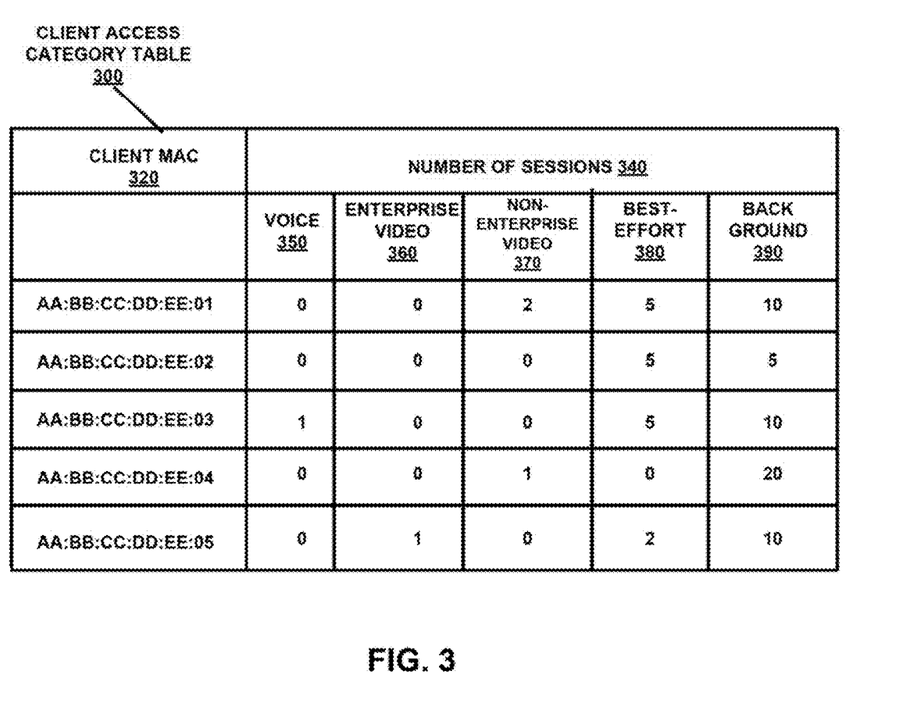
FIG. 3 shows a diagram illustrating an exemplary client access category table according to embodiments of the present disclosure.

FIG. 3 shows exemplary session information and categories according to embodiments of the present disclosure. FIG. 3 includes a client access category table 300 having entries with at least a Client Media Access Control (MAC) address 320, and a number of sessions 340. Further, the number of sessions 340 can be sub-categorized into five access categories, namely, voice 350, enterprise video 360, non-enterprise video 370, best effort 380, and background 390.

As illustrated in FIG. 3, the client device with MAC address of AA:BB:CC:DD:EE:01 has a number of applications running on the device. Among them, two applications are categorized as non-enterprise video 370; five applications are categorized as best effort 380; and ten applications are categorized as background 390.

AP Access Category Table

In some embodiments, the network controller also maintains a new lookup table, indexed on AP, called "AP Access Category Table." The AP Access Category Table lists the total number of sessions falling in these five access categories for all client devices associated to AP. When a session is terminally classified as a particular application, depending on the application-to-access-category mapping, the corresponding counter is incremented for the AP to which the client device is associated to. Similarly when the session is timed out, the corresponding counter is decremented for the client device.

Load Balancing

The network controller periodically scans through AP Access Category Table to check if there is any skew in the load distribution of client devices among AP's. To do this, the network controller checks the number of sessions for all access categories currently handled by the AP. If an AP is found to be handling more than the designed capacity, the AP is marked to indicate that it has reached maximum capacity. Since the number of concurrent sessions that an AP can handle varies for different access categories, this ensures that AP is immediately marked for having reached maximum capacity when the sum of load of all the access categories exceeds the threshold limit. Also, the AP is marked for load balancing to steer away one or more client devices to lower the load on the AP.

A. Identify Client Devices Requiring Steering Away

Once a particular AP is marked for load balancing, the network controller can perform a lookup in a Client Access Category Table to find the list of all client devices connected to the particular AP and select one or more client devices to steer to another neighboring AP. To steer a client device to the neighboring AP, the one or more client devices need to meet the following two requirements: (a) The client devices should not be handling any latency sensitive sessions, such as, voice applications; and (b) The client devices should have a decent SNR value for the neighboring AP. Once a client device is found with the above two properties, it can be guided by the particular AP to associate with a neighboring AP.

In some embodiments, if the load factor for the particular AP exceeds a predetermined threshold value, the particular AP and/or the network controller can select client devices that are running best effort and/or background sessions to be steered away to a neighboring AP.

In some embodiments, the network controller can keep checking whether the load of the particular AP exceeds a predetermined threshold value. If so, the network controller will continue to select more client devices to steer to another neighboring AP until the load of the particular is below the predetermined threshold value.

In some embodiments, if a particular access category for the particular AP exceeds a predetermined threshold value and an existing client device attempts to initiate a new session of the particular access category, the particular AP and/or the network controller can select the existing client device to be steered away to another neighboring AP.

B. Identify Destination AP for each Client Requiring Steering

To determine a destination AP to which a particular client device should be steered to, the network controller uses the following criteria. First, the particular client device should have an acceptable SNR for the destination AP. The SNR can be obtained from looking up virtual beacon report (VBR) table. Each AP periodically sends to the network controller a virtual beacon report, which includes the SNRs of signals received from each client device in the neighborhood of the AP. Second, the destination AP has not reached limits for any access category. This information can be obtained from looking up AP Access Category Table. Third, the addition of the particular client device to the destination AP does not result in exceeding of limits for any of the access categories.

Figure 4A:
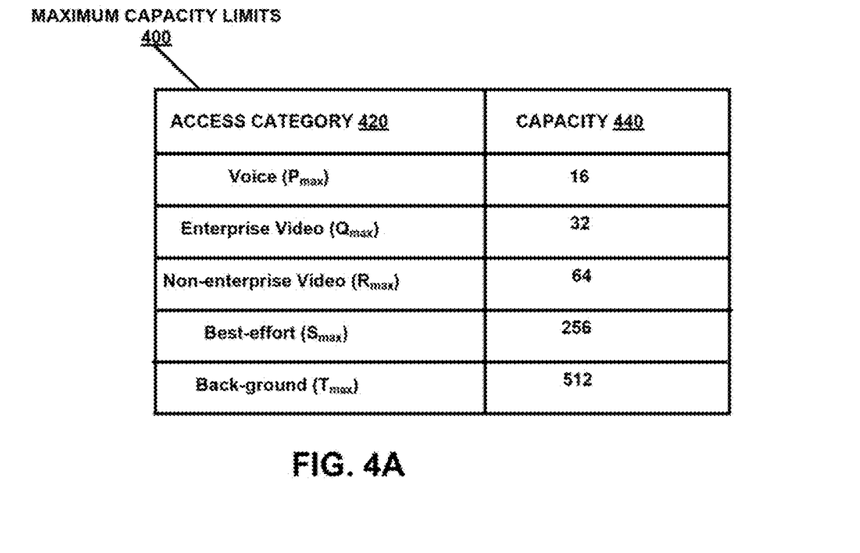
FIG. 4A shows a diagram illustrating an exemplary maximum capacity limit per access category according to embodiments of the present disclosure.
Figure 4B:
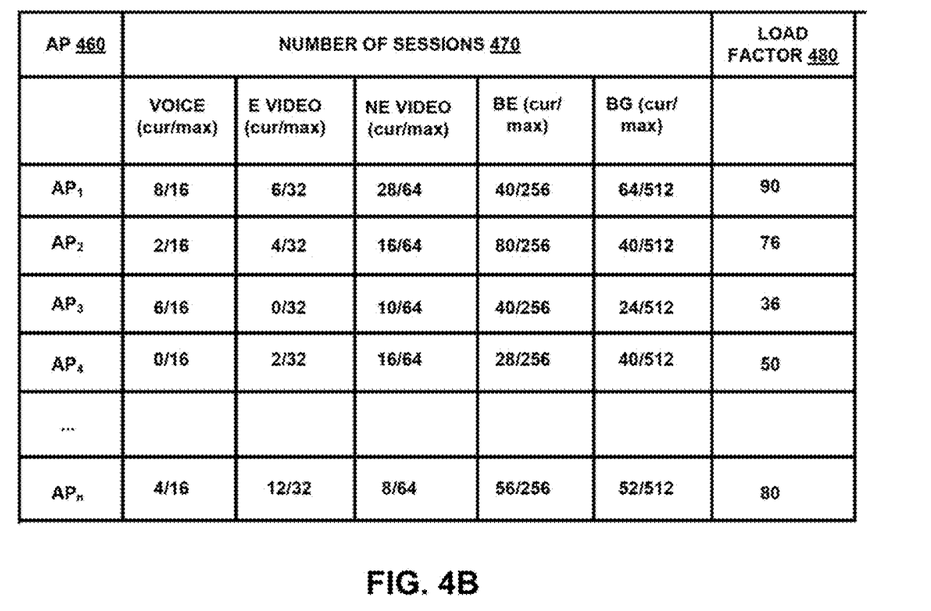
FIG. 4B shows a diagram illustrating an exemplary load factor calculation according to embodiments of the present disclosure.

FIGS. 4A and 4B illustrate an exemplary load factor calculation. Specifically, FIG. 4A illustrates maximum capacity limits for the access categories. Maximum capacity limits table 400 in FIG. 4A includes at least an access category field 420 and a capacity field 440. As shown in FIG. 4A, in this particular example, the maximum capacity for voice access category ($P_{max}$) is 16; the maximum capacity for enterprise video access category ($Q_{max}$) is 32; the maximum capacity for non-enterprise video access category ($R_{max}$) is 64; the maximum capacity for best effort access category ($S_{max}$) is 256; the maximum capacity for background access category ($T_{max}$) is 512; etc.

Assuming that the acceptable threshold is configured to be 80%. Thus, the load factor (N) of an AP can determined as:

$$N=(Q/Q_{max}+R/R_{max}+S/S_{max}+T/T_{max})*100$$

Here, N indicates the load factor of the AP; Q indicates the current number of concurrent enterprise video sessions; R indicates the current number of concurrent non-enterprise video sessions; S indicates the current number of concurrent best effort sessions; T indicates the current number of concurrent background sessions; etc. Note that, because voice sessions are not data-intensive sessions, voice sessions are not considered while calculating the load factor for an AP.

FIG. 4B illustrates a detailed example of load factor calculation. Specifically, FIG. 4B includes at least an access point field 460, a number of sessions field 470, and a load factor field 480. Furthermore, the number of sessions 480 can be sub-categorized into five access categories, namely, voice sessions, enterprise video sessions, non-enterprise video sessions, best effort sessions, and background sessions.

In this example, access point $AP_1$ is currently loaded with 8 voice sessions, 6 enterprise video sessions, 28 non-enterprise video sessions, 40 best effort sessions, and 64 background sessions. Thus, $N=(Q/Q_{max}+R/R_{max}+S/S_{max}+T/T_{max})*100\%=(8/16+6/32+28/64+40/256+64/512)*100\%=90\%$. Therefore, $AP_1$ is found to be loaded beyond the acceptable threshold (e.g., 80%). As such, one or more client devices shall be identified for steering to an adjacent AP that is relatively lightly loaded. Also, the client devices are associated with an acceptable SNR value by the adjacent AP based on signals received from the client devices. Note that, the client device that is identified for steering should not be running any latency sensitive sessions, such as, a voice application session and/or an enterprise video application session.

If two or more APs have the same load factor, the network controller will select the AP with the least number of concurrent voice sessions to be the destination AP. Likewise, if two or more APs have the same load factor and the same number of concurrent voice sessions, then the network controller will select the AP with the least number of concurrent video sessions to be the destination AP to steer the client devices to.

Embodiments of the present disclosure can prevent a client device from associating to an already overloaded access point in terms the number of concurrent sessions supported by the access point for its associated client devices. In addition, the techniques described herein can balance the load of an access point by steering away one or more associated client devices to one or more adjacent access points. Furthermore, the techniques described herein can identify a subset of client devices that are more suitable to be steered away from the loaded access point depending on the nature of sessions in transit on the client devices. Last but not least, the techniques described herein can identify one or more access points to steer the identified subset of client devices to depending on the nature of sessions currently handled by the access point and the SNR values of the signals received by the identified access point from the subset of client devices.

Process for Session Aware Access Point Load Balancing

Figure 5:
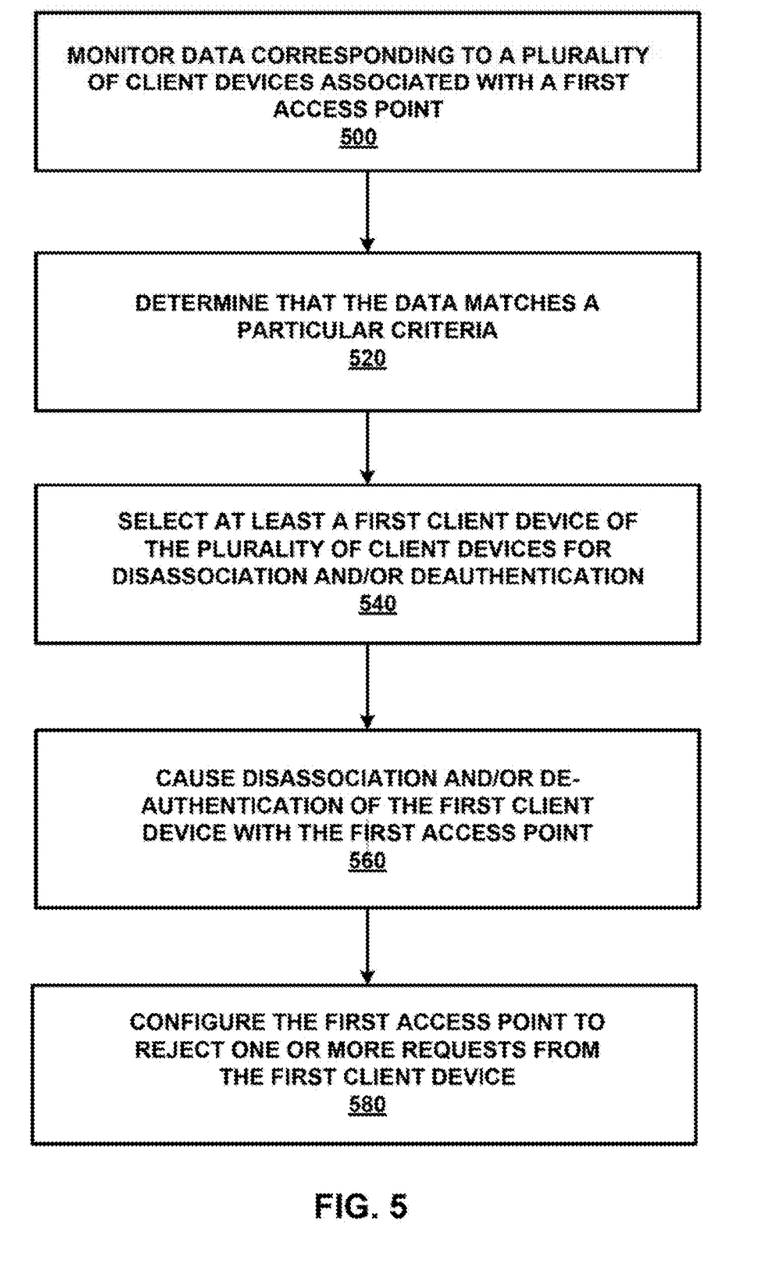
FIG. 5 shows a sequence diagram illustrating an exemplary session aware AP load balancing process according to embodiments of the present disclosure.
Figure 6:
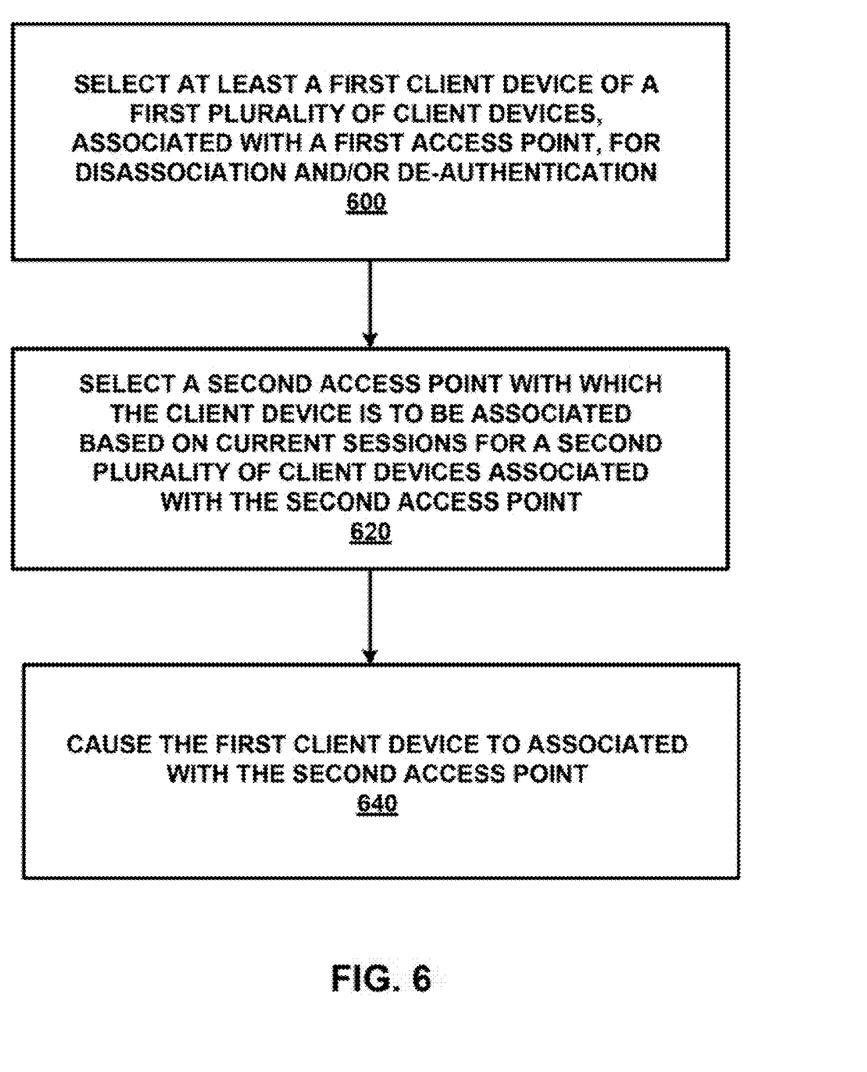
FIG. 6 shows a sequence diagram illustrating an exemplary session aware AP load balancing process according to embodiments of the present disclosure.

FIGS. 5-6 illustrate exemplary processes for performing session aware access point load balancing according to embodiments of the present disclosure. More specifically, a network device can monitor data corresponding to a plurality of client devices associated with a first access point (operation 500). The network device also determines that the data matches particular criteria (operation 520). Responsive to determining that the data matches the particular criteria, the network device selects at least a first client device of the plurality of client devices for disassociation and/or de-authentication (operation 640). Then, the network device causes disassociation and/or de-authentication of the first client device with the first access point (operation 560). Moreover, subsequent to causing disassociation and/or de-authentication of the first client device, the network device can configure the first access point to reject one or more requests from the first client device (operation 680).

In some embodiments, the network device determines that the data matches particular criteria by determining that a number of sessions with a particular access category exceed an access category threshold. Specifically, the particular access category is one of a voice access category, a video access category, a best effort access category, and a background access category. Moreover, the video access category can be one of enterprise video category or non-enterprise video category.

In some embodiments, the first client device is selected based on the first client device having a current session associated with the particular access category. Here, the particular access category can be a video category or a voice category. The first client device is selected based on the first client device not having a current session associated with the particular access category.

In some embodiments, the network device can further select a second access point for the first client device to associate with. Here, the second access point can be selected based on current sessions corresponding to a set of client devices associated with the second access point. In some embodiments, the network device selects the second access point based on a subset of the current sessions that correspond to a particular access category. In some embodiments, the network device further selects a second access point for the first client device to associate with. Here, the second access point is selected based on determining that a signal strength value associated with a signal between the first client device and the second access point meets a minimum threshold for session types of any current sessions for the first client device.

In some embodiments, the first client device is selected responsive to determining that the first client device does not have any current sessions that are latency sensitive sessions.

FIG. 6 illustrates another process for session aware access point load balancing. During operations, a network device selects at least a first client device of a first plurality of client devices, associated with a first access point, for disassociation and/or de-authentication (operation 600). Also, the network device selects a second access point with which the client device is to be associated based on current sessions for a second plurality of client devices associated with the second access point (operation 620). Next, the network device causes the first client device to associate with the second access point (operation 640).

In some embodiments, the network device further selects a second access point for the first client device to associate with. The second access point is selected based on determining that a strength value of a signal between the first client device and the second access point meets a minimum threshold for session types of any current sessions for the first client device.

In some embodiments, selecting the second access point is based on a subset of the current sessions that correspond to a particular access category. Note that, the particular access category may be one of: a voice access category, a video access category, a best effort access category, and a background access category. In some embodiments, the particular access category can be one of enterprise video category or non-enterprise video category.

System for Session Aware Access Point Load Balancing

Figure 7:
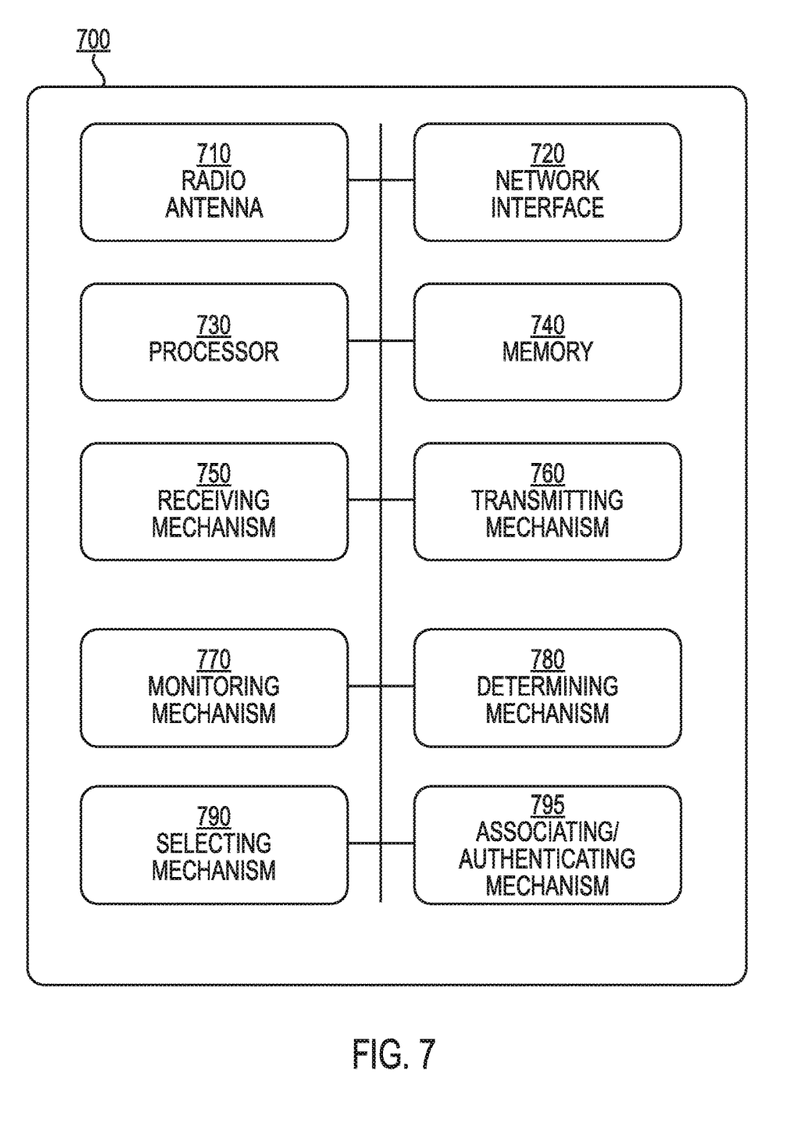
FIG. 7 is a block diagram illustrating an exemplary system for performing session aware AP load balancing according to embodiments of the present disclosure.

FIG. 7 is a block diagram illustrating an exemplary system for performing session aware access point load balancing according to embodiments of the present disclosure. Network device 700 includes at least one or more radio antennas 710 capable of either transmitting or receiving radio signals or both, a network interface 720 capable of communicating to a wired or wireless network, a processor 730 capable of processing computing instructions, and a memory 740 capable of storing instructions and data. Moreover, network device 700 further includes a receiving mechanism 750, a transmitting mechanism 760, a monitoring 770, a determining mechanism 780, a selecting mechanism 790, and an associating/authenticating mechanism 795, all of which are in communication with processor 730 and/or memory 740 in network device 700. Network device 700 may be used as a client system, or a server system, or may serve both as a client and a server in a distributed or a cloud computing environment.

Radio antenna 710 may be any combination of known or conventional electrical components for receipt of signaling, including but not limited to, transistors, capacitors, resistors, multiplexers, wiring, registers, diodes or any other electrical components known or later become known.

Network interface 720 can be any communication interface, which includes but is not limited to, a modem, token ring interface, Ethernet interface, wireless IEEE 802.11 interface, cellular wireless interface, satellite transmission interface, or any other interface for coupling network devices.

Processor 730 can include one or more microprocessors and/or network processors. Memory 740 can include storage components, such as, Dynamic Random Access Memory (DRAM), Static Random Access Memory (SRAM), etc.

Receiving mechanism 750 generally receives one or more network messages via network interface 720 or radio antenna 710 from a wireless client. The received network messages may include, but are not limited to, requests and/or responses, beacon frames, management frames, control path frames, and so on.

Transmitting mechanism 760 generally transmits messages, which include, but are not limited to, requests and/or responses, beacon frames, management frames, control path frames, and so on.

Monitoring mechanism 770 generally monitors data corresponding to a plurality of client devices associated with an access point.

Determining mechanism 780 generally determines that the data matches a set of particular criteria. Specifically, determining mechanism 780 determines that a number of sessions associated with a particular access category exceeds a threshold value for the particular access category. The particular access category can be one of a voice access category, a video access category, a best effort access category, and a background access category. The video access category can be one of enterprise video access category or non-enterprise video access category.

Selecting mechanism 790 generally selects at least a first client device of the plurality of client devices for disassociation and/or de-authentication.

In some embodiments, selecting mechanism 790 selects the first client device in response to determining mechanism 780 determining that the data matches the particular criteria.

In some embodiments, selecting mechanism 790 selects the first client device based on the first client device having a current session associated with the particular access category. The particular access category can be a video access category or a voice access category. Furthermore, in some embodiments, selecting mechanism 790 can select the first client device based on the first client device not having a current session associated with the particular access category.

Furthermore, selecting mechanism 790 can also select a second access point for the first client device to associate with. Specifically, selecting mechanism 790 can select the second access point based on current sessions corresponding to a set of client devices associated with the second access point.

In some embodiments, selecting mechanism 790 selects the second access point based on a subset of the current sessions that correspond to a particular access category. In some embodiments, selecting mechanism 790 selects the second access point based on determining mechanism 780 determining that a signal strength associated with a signal between the first client device and the second access point meets a minimum threshold value for session types of any current sessions for the first client device.

In some embodiments, selecting mechanism selects the first client device in response to determining mechanism 780 determining that the first client device does not have any current sessions that are latency sensitive sessions.

Also, selecting mechanism 790 can further select a second access point with which the client device is to be associated based on current sessions for a second plurality of client devices associated with the second access point. Specifically, selecting mechanism 790 can select the second access point based on determining mechanism 780 determining that a signal strength associated with a signal between the first client device and the second access point meets a minimum threshold for session types of any current sessions for the first client device. In some embodiments, selecting mechanism 790 selects the second access point based on a subset of the current sessions that correspond to a particular access category.

Associating/authenticating mechanism 795 generally causes disassociation and/or de-authentication of a first client device with a first access point. Subsequent to causing disassociation and/or de-authentication of the first client device, associating/authenticating mechanism 795 can configure the first access point to reject one or more requests from the first client device. In some embodiments, associating/authenticating mechanism 795 causes the first client device to associate specifically with the second access point.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation: b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network that links two or more devices using some wireless distribution method (for example, spread-spectrum or orthogonal frequency division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium comprising instructions which, when executed by one or more hardware processors, causes performance of operations comprising:

monitoring data corresponding to a plurality of client devices associated with a first access point;

categorizing the data corresponding to the plurality of client devices into a number of session categories, wherein the number of session categories are application sessions corresponding to the plurality of client devices;

identifying a concurrent session threshold for each of the number of session categories, wherein the concurrent session threshold is a quantity of sessions within a same session category of the number of session categories associated with the first access point;

determining that the data matches a particular criteria, wherein the particular criteria includes the concurrent session threshold;

responsive to determining that the data matches the particular criteria, selecting at least a first client device of the plurality of client devices for disassociation or de-authentication, wherein the first client device is utilizing a corresponding application session within a corresponding session category that has exceeded a corresponding concurrent session threshold for the first access point; and causing disassociation or de-authentication of the first client device with the first access point.

2. The non-transitory computer readable medium of claim 1, wherein the operations further comprise: subsequent to causing disassociation or deauthentication of the first client device, configuring the first access point to reject one or more requests from the first client device.

3. The non-transitory computer readable medium of claim 1, wherein determining that the data matches the particular criteria comprises determining that a number of sessions with a particular access category exceed an access category threshold.

4. The non-transitory computer readable medium of claim 3, wherein the particular access category is one of a voice access category, a video access category, a best effort access category, and a background access category.

5. The non-transitory computer readable medium of claim 3, wherein the particular access category is one of enterprise video category or nonenterprise video category.

6. The non-transitory computer readable medium of claim 3, wherein the first client device is selected based on the first client device having a current session associated with the particular access category.

7. The non-transitory computer readable medium of claim 3, wherein the particular access category is a video category or a voice category, and wherein the first client device is selected based on the first client device not having a current session associated with the particular access category.

8. The non-transitory computer readable medium of claim 1, wherein the operations further comprise selecting a second access point for the first client device to associate with, wherein the second access point is selected based on current sessions corresponding a set of client devices associated with the second access point.

9. The non-transitory computer readable medium of claim 8, wherein selecting the second access point based on a subset of the current sessions that correspond to a particular access category.

10. The non-transitory computer readable medium of claim 8, wherein the operations further comprise selecting the second access point for the first client device to associate with, wherein the second access point is selected based on determining that a signal strength between the first client device and the second access point meets a minimum threshold for session types of any current sessions for the first client device.

11. The non-transitory computer readable medium of claim 1, wherein the first client device is selected responsive to determining that the first client device does not have any current sessions that are latency sensitive sessions.

12. A non-transitory computer readable medium comprising instructions which, when executed by one or more hardware processors, causes performance of operations comprising:

categorizing data corresponding to a first plurality of client devices and a second plurality of client devices into a number of session categories, wherein the number of session categories are application sessions corresponding to the plurality of client devices;

identifying a concurrent session threshold for each of the number of session categories, wherein the concurrent session threshold is a quantity of sessions within a same session category of the number of session categories associated with the first access point;

determining that the data matches a particular criteria, wherein the particular criteria includes the concurrent session threshold;

selecting client device of the first plurality of client devices, associated with a first access point, for disassociation or de-authentication based on the client device utilizing a corresponding application session within a corresponding session category that has exceeded a corresponding concurrent session threshold for the first access point;

selecting a second access point with which the client device is to be associated based on a current quantity of sessions within the particular session category for a second plurality of client devices associated with the second access point;

causing the client device to associate with the second access point.

13. The non-transitory computer readable medium of claim 12, wherein the operations further comprise selecting the second access point for the client device to associate with, wherein the second access point is selected based on determining that a signal strength between the client device and the second access point meets a minimum threshold for session types of any current sessions for the client device.

14. The non-transitory computer readable medium of claim 12, wherein selecting the second access point is based on a subset of current sessions that correspond to a particular access category.

15. The non-transitory computer readable medium of claim 14, wherein the particular access category is one of a voice access category, a video access category, a best effort access category, and a background access category.

16. The non-transitory computer readable medium of claim 14, wherein the particular access category is one of enterprise video category or nonenterprise video category.

* * * * *